(12) United States Patent
Goto et al.

(10) Patent No.: US 6,901,906 B2
(45) Date of Patent: Jun. 7, 2005

(54) APPARATUS AND METHOD FOR CONTROLLING AIR-FUEL RATIO IN DIRECT-INJECTION INTERNAL COMBUSTION ENGINE

(75) Inventors: Yuichi Goto, Toyota (JP); Kazuhiro Iwahashi, Okazaki (JP); Takayuki Demura, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/635,532

(22) Filed: Aug. 7, 2003

(65) Prior Publication Data

US 2004/0040541 A1 Mar. 4, 2004

(30) Foreign Application Priority Data

Aug. 27, 2002 (JP) ........................................ 2002-246798

(51) Int. Cl.⁷ .................................................. F02B 3/00
(52) U.S. Cl. ........................................ 123/299; 701/103
(58) Field of Search ................................ 123/299, 443, 123/676, 686; 701/103, 109

(56) References Cited

U.S. PATENT DOCUMENTS

| | | | | | |
|---|---|---|---|---|---|
| 5,970,950 | A | * | 10/1999 | Shimizu et al. | 123/295 |
| 6,073,606 | A | * | 6/2000 | Shimizu et al. | 123/295 |
| 6,116,208 | A | * | 9/2000 | Nishimura et al. | 123/295 |
| 6,631,704 | B2 | * | 10/2003 | Ogawa et al. | 123/295 |

FOREIGN PATENT DOCUMENTS

| | | |
|---|---|---|
| DE | 196 46 941 | 5/1998 |
| DE | 101 15 996 | 10/2002 |
| JP | 2000-045840 A | 2/2000 |

OTHER PUBLICATIONS

Patent Abstracts of Japan, JP 2000045840, Feb. 15, 2000, Toyota Motor Corp.

* cited by examiner

*Primary Examiner*—Hai Huynh
(74) *Attorney, Agent, or Firm*—Kenyon & Kenyon

(57) ABSTRACT

In air-fuel ratio feedback control, a rich skip amount is made larger than a lean skip amount by an offset amount OS such that a feedback control center is offset to the rich side. As a result, the amount of error from an erroneous detection by an $O_2$ sensor is absorbed and deterioration of gas emissions in a multiple-injection mode is minimized.

7 Claims, 13 Drawing Sheets

APPARATUS AND METHOD FOR CONTROLLING AIR-FUEL RATIO IN DIRECT-INJECTION INTERNAL COMBUSTION ENGINE

INCORPORATION BY REFERENCE

The disclosure of Japanese Patent Application No. 2002-246798 filed on Aug. 27, 2002, including the specification, drawings and abstract is incorporated herein by reference in its entirety.

BACKGROUND OF THE INVENTION

1. Field of the Invention

The invention relates to an apparatus for controlling the air-fuel ratio in a direct-injection internal combustion engine. More specifically, the invention relates to an apparatus for controlling the air-fuel ratio, which performs feedback control according to a fuel injection mode.

2. Description of the Related Art

Direct-injection internal combustion engines, which are provided with fuel injection valves (hereinafter referred to as "fuel injectors") that inject fuel directly into the cylinders, offer improved fuel consumption and output characteristics. As a result, the use of these types of engines is expected to further increase in the future. When these types of internal combustion engines employ a single-injection mode in which a substantially large quantity of fuel is injected at once in a single injection during one cycle, some of the injected fuel tends to bounce off of the piston head and adhere to the spark plug at low temperatures which hinder the atomization of injected fuel. In particular, immediately after a cold start when the engine has not yet sufficiently warmed up, the amount of fuel injected is increased in order to facilitate combustion. This increase in the amount of injected fuel, however, in turn results in an increase in the amount of fuel adhered to the spark plug, thereby fouling the spark plug. This fouling tends to hinder the effective sparking of the spark plug and thus effective ignition of the air-fuel mixture. To avoid this problem, art is proposed in Japanese Patent Laid-Open Publication No. 2000-45840 which employs a multiple-injection mode in which some of the fuel is injected during the first half of the intake stroke and some during the second half of the intake stroke. More specifically, this art uses a multiple-injection mode in which more fuel is injected during the first half of the intake stroke than during the second half of the intake stroke, thereby reducing the amount of fuel adhered to the spark plug.

To operate the engine at stoichiometric combustion in the single-injection mode, feedback control is performed based on a value output from an air-fuel ratio sensor provided in an exhaust passage, such that the weight ratio of air being drawn into the cylinder to fuel (hereinafter referred to as "engine air-fuel ratio") becomes the stoichiometric air-fuel ratio. By maintaining the engine air-fuel ratio at the stoichiometric air-fuel ratio and effectively purifying the exhaust gas with a fully functioning three-way catalyst, deterioration of the exhaust emissions is able to be minimized. Similarly, even when operating at stoichiometric combustion in the multiple-injection mode, it is still necessary to minimize deterioration of the exhaust emissions.

The inventors have confirmed a phenomenon in which the amount of NOx emissions increases when the air-fuel ratio in the multiple-injection mode is controlled using a feedback control method for the single-injection mode. According to the inventors, a conceivable explanation for this phenomenon is as follows. The oxygen concentration in the exhaust gas is detected by an air-fuel ratio sensor, which is typically an $O_2$ sensor or an A/F sensor. Feedback control is then performed on the engine air-fuel ratio based on that detected value. The construction of the air-fuel ratio sensor makes it vulnerable to being adversely effected by hydrogen. When fuel is injected a plurality of times in one cycle at low temperatures, the distribution of the fuel inside the combustion chamber is uneven compared to when it is injected only once at normal temperature. As a result, good combustion conditions are unable to be maintained, which results in the exhaust gas containing a large quantity of hydrogen. This hydrogen reacts with the oxygen inside the air-fuel ratio sensor, such that the air-fuel ratio sensor obtains a detection value that indicates a richer air-fuel ratio than the actual engine air-fuel ratio when the engine is operating in the multiple-injection mode. As a result, an engine air-fuel ratio that is actually lean may be erroneously detected as being rich. It can then be presumed that, based on this erroneous detected value, feedback control would then attempt to shift the engine air-fuel ratio toward the lean side, which would result in the engine air-fuel ratio being leaner than the stoichiometric air-fuel ratio, thus increasing the amount of NOx emissions.

SUMMARY OF THE INVENTION

In view of the foregoing problems, the invention thus provides an apparatus for controlling an air-fuel ratio, which performs superior feedback control of the air-fuel ratio according to the fuel injection mode.

Therefore, a first aspect of the invention relates to an apparatus for controlling an air-fuel ratio of a direct-injection internal combustion engine having i) a first injection mode in which stoichiometric combustion is achieved by injecting fuel once in one cycle, and ii) a second injection mode in which stoichiometric combustion is achieved by injecting the fuel a plurality of times in one cycle. To operate the engine at stoichiometric combustion, the apparatus performs feedback control based on a value output from an air-fuel ratio sensor provided in an exhaust passage, such that an engine air-fuel ratio becomes the stoichiometric air-fuel ratio. With this apparatus, the control center of the feedback control shifts in a direction to make the engine air fuel ratio richer, relative to the control center in the first injection mode.

With the apparatus described above, in the second injection mode the engine air-fuel ratio is controlled toward the rich side when there is a tendency for it to become offset to the lean side due to an erroneous detection by the air-fuel ratio sensor. As a result, it is possible to reduce the effect of the erroneous detection by the air-fuel ratio sensor on the feedback control. Therefore, even in the second injection mode, appropriate air-fuel ratio feedback control is able to be achieved. Further, a deterioration in exhaust emissions is able to be minimized even when a plurality of fuel injection modes are used in combination.

In order to change the control center of the feedback control, a correction speed of the feedback control to shift the engine air-fuel ratio from the lean side toward the rich side may also be controlled to be greater than the correction speed of the feedback control to shift the engine air-fuel ratio from the rich side toward the lean side. For example, a correction quantity of the feedback control to shift the engine air-fuel ratio from the lean side toward the rich side immediately after it was shifted from the rich side toward the lean side may also be controlled to be greater than the correction quantity of the feedback control to shift the engine air-fuel ratio from the rich side toward the lean side immediately after it was shifted from the lean side toward the rich side. In this specification, "shift the engine air-fuel ratio" means shifting the engine air-fuel ratio detected based on the value output from the air-fuel ratio sensor between lean and rich, with the dividing line between them being the stoichiometric air-fuel ratio. It should be noted that this shift does not exactly match the actual shift between the actual lean and rich of the engine air-fuel ratio. Further, "immediately after it (i.e., the engine air-fuel ratio) was shifted" is meant to include not only the instant of the shift, but also a predetermined amount of time after the shift.

Also, in order to change the control center of the feedback control, the start timing of the feedback control to shift the engine air-fuel ratio from the rich side toward the lean side may be delayed with respect to the start timing of the feedback control to shift the engine air-fuel ratio from the lean side toward the rich side, with the points (i.e., timings) at which the value output from the air-fuel ratio sensor switches with respect to the reference value being the respective starting points.

The invention is also intended to cover methods and programs corresponding to the foregoing constructions.

BRIEF DESCRIPTION OF THE DRAWINGS

The foregoing and/or further objects, features and advantages of the invention will become more apparent from the following description of preferred embodiments with reference to the accompanying drawings, in which like numerals are used to represent like elements and wherein.

DETAILED DESCRIPTION OF THE PREFERRED EMBODIMENTS

Figure 1:
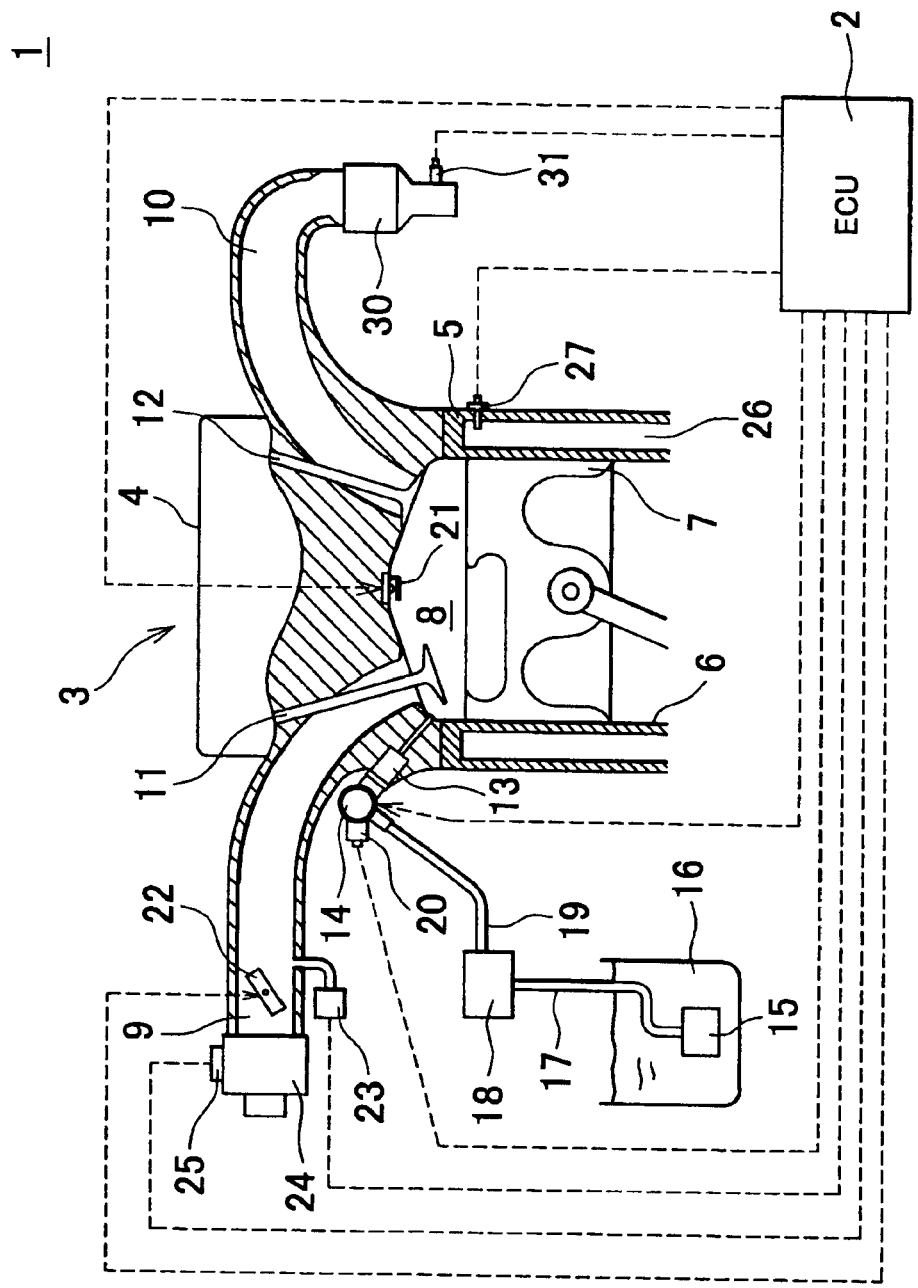
FIG. 1 is a view schematically showing the construction of a direct-injection internal combustion engine provided with an apparatus for controlling the air-fuel ratio according to one exemplary embodiment of the invention.

Hereafter, exemplary embodiments of the invention will be explained with reference to the accompanying drawings. In order to facilitate understanding of the explanation, the same reference numerals will, as much as possible, be assigned to the same components in each drawing, and redundant explanations will be omitted.

FIG. 1 schematically shows a construction of a direct-injection internal combustion engine (hereinafter referred to as "engine") 1 provided with an apparatus for controlling the air fuel ratio according to one exemplary embodiment of the invention. To operate the engine 1 at stoichiometric combustion, the engine 1 has both a single-injection mode, in which fuel is injected only once in one cycle, and a multiple-injection mode, in which fuel is injected a plurality of times in one cycle. To operate the engine 1 at stoichiometric combustion, the apparatus for controlling the air-fuel ratio according to this exemplary embodiment performs feedback control based on a value output from an air-fuel ratio sensor 31 provided in an exhaust passage 10, such that the engine air-fuel ratio becomes the stoichiometric air-fuel ratio. This control is executed by an electronic control unit (hereinafter referred to as "ECU") 2.

An engine body 3 is provided with a cylinder head 4 and a cylinder block 5. In this cylinder block 5 is formed a cylinder 6. In this drawing only one cylinder 6 is shown, but the invention is not limited to only one. A piston 7 is provided in the cylinder 6 so as to be able to reciprocate. A connecting rod (only a portion is shown in the drawing) connects the piston 7 at a lower portion thereof to a crankshaft, not shown. The head of the piston 7, the inner wall surface of the cylinder 6, and the bottom surface of a cylinder head 4 together define a combustion chamber 8. Portions of an intake passage 9 and an exhaust passage 10, which are connected to the combustion chamber 8, are formed in the cylinder head 4. Flow to the combustion chamber 8 through the intake passage 9 is selectively allowed and interrupted by opening and closing an intake valve 11. Similarly, flow from the combustion chamber 8 through the exhaust passage 10 is selectively allowed and interrupted by opening and closing an exhaust valve 12. A throttle valve 22 is provided in the intake passage 9. The opening amount of the throttle valve 22 is adjusted by a command from the ECU 2. An air cleaner 24 is provided at an end portion of the intake passage 9. A vacuum sensor 23 detects an intake air pressure, and an intake air temperature sensor 25 detects an intake air temperature. The detected values are then sent to the ECU 2. A low pressure fuel pump 15, which is an electric pump driven by a battery, draws up fuel from within a fuel tank 16 and feeds it to a high pressure fuel pump 18 through a low pressure fuel line 17. The high pressure fuel pump 18 is a mechanical pump that is driven by a camshaft connected by a chain or the like to the crankshaft. This high pressure fuel pump 18 pressurizes the fuel received through the low pressure fuel line 17 and sends it under pressure through a discharge line 19 to a delivery pipe 14. The discharge line 19 and delivery pipe 14 together make up a high pressure fuel line. A fuel pressure sensor 20 detects the fuel pressure within the delivery pipe 14 and sends a signal indicative of that pressure to the ECU 2. A fuel injector 13 is arranged between the delivery pipe 14 and the combustion chamber 8, and upon receiving an injection command from the ECU 2, injects the necessary amount of fuel into the combustion chamber 8 at a desired timing.

A spark plug 21 is disposed in the combustion chamber 8. The spark timing of this spark plug 21 is controlled by the ECU 2. The cylinder block 5 is provided with a water jacket 26 that serves as a path through which coolant flows. A coolant temperature sensor 27 detects the coolant temperature. The ECU 2 receives the coolant temperature as an amount which correlates with the engine temperature.

A catalytic converter 30 is provided in the exhaust passage 10. In this catalytic converter 30 is a catalyst, e.g., a three-way catalyst, which purifies toxic components in the exhaust gas. An air-fuel ratio sensor 31 is disposed downstream of this catalytic converter 30. The air-fuel ratio sensor 31 detects a specific component in the exhaust gas. This air-fuel ratio sensor 31 may be one of a variety of types of sensors including an $O_2$ sensor and an A/F sensor that detects the oxygen concentration. In another exemplary embodiment, the air-fuel ratio sensor may be provided upstream of the catalytic converter 30 or both upstream and downstream of the catalytic converter 30.

Figure 2:
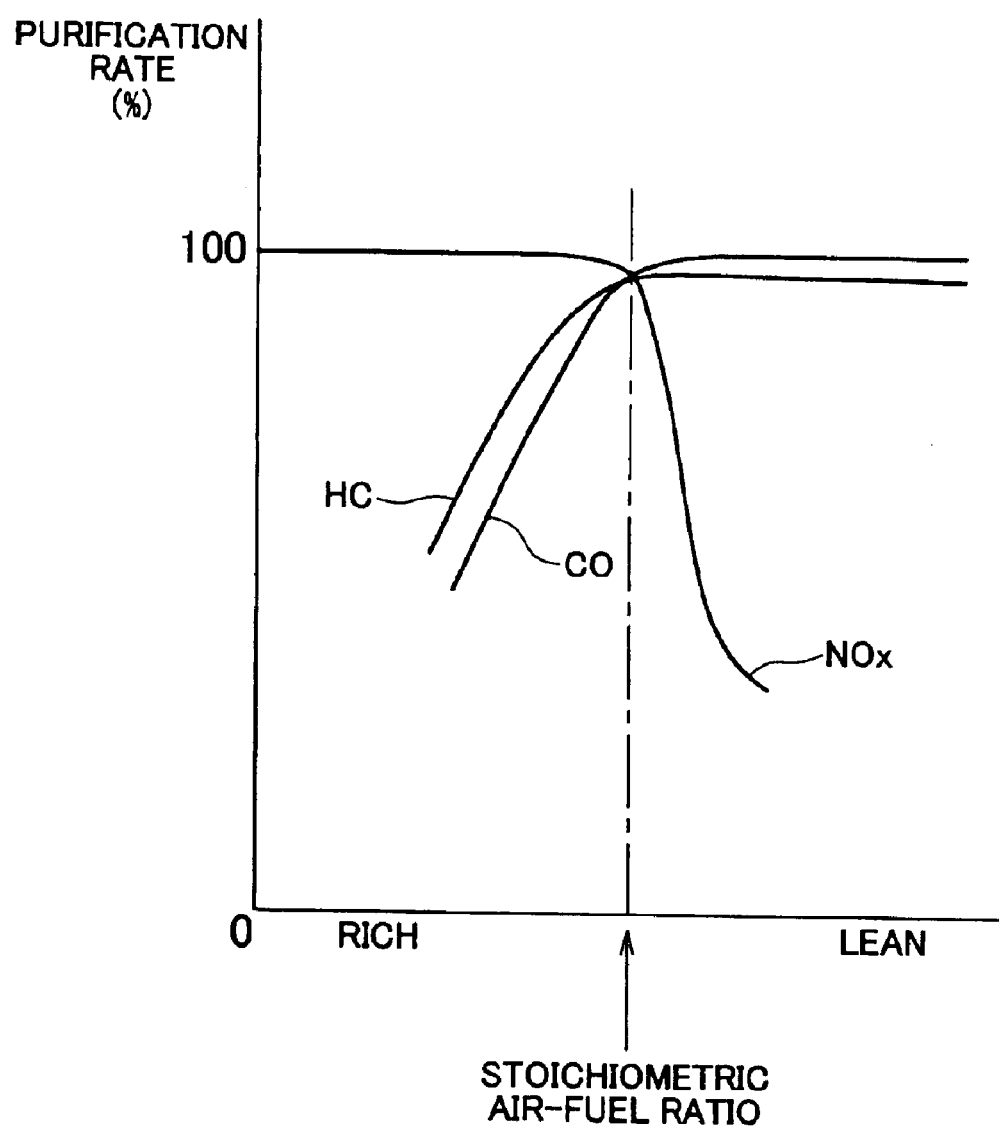
FIG. 2 is a graph illustrating purifying characteristics of a three-way catalyst.

FIG. 2 is a graph illustrating the purifying characteristics of a three-way catalyst. The purification rate of the three-way catalyst is nearly 100% for nitrides of oxygen (NOx) when the engine air-fuel ratio is richer than the stoichiometric air-fuel ratio and then gradually declines as the engine air-fuel ratio becomes leaner than the stoichiometric air-fuel ratio. On the other hand, the purification rate of the three-way catalyst is nearly 100% for hydrocarbons (HC) and carbon monoxide (CO) when the engine air-fuel ratio is leaner than the stoichiometric air-fuel ratio and then gradually declines as the engine air-fuel ratio becomes richer than the stoichiometric air-fuel ratio. From these characteristics, if the engine air-fuel ratio is the stoichiometric air-fuel ratio, the three-way catalyst can purify NOx, HC, and CO simultaneously at an extremely high rate. At stoichiometric combustion, the fuel injection quantity of the fuel injector 13 is adjusted based on a value output from the air-fuel ratio sensor 31 such that the engine air-fuel ratio becomes the stoichiometric air-fuel ratio. This control called "air-fuel ratio feedback control," but may also be referred to hereinafter as simply "feedback control."

Figure 3:
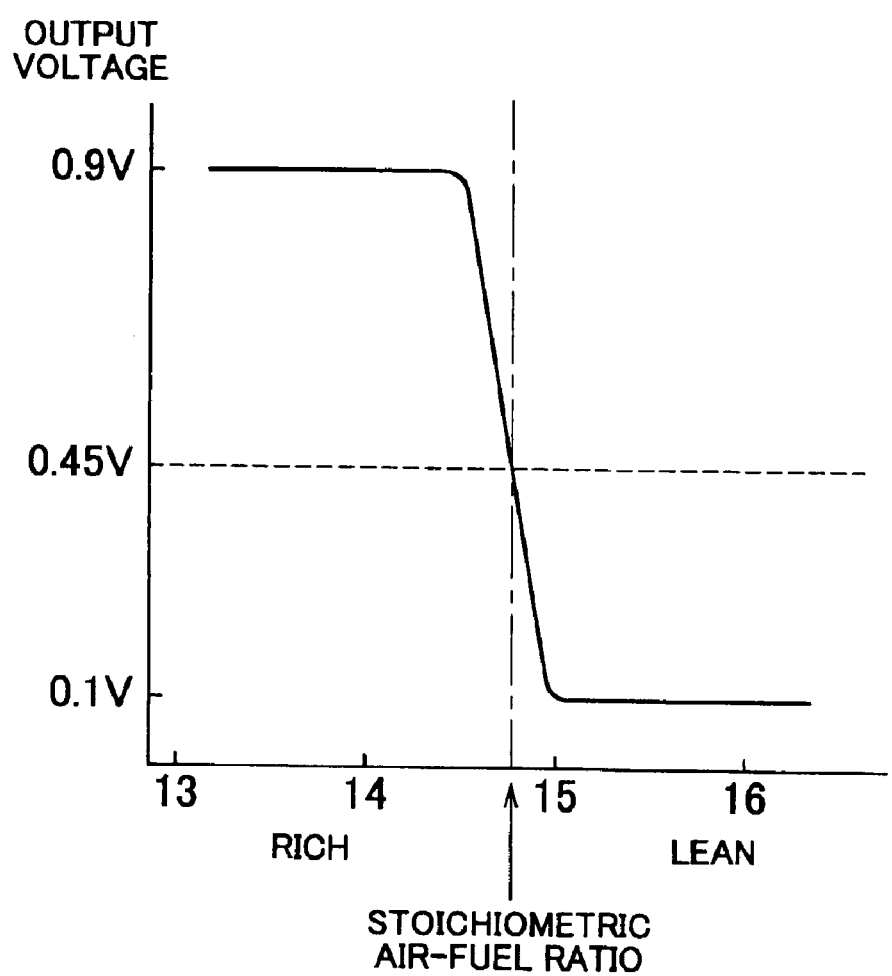
FIG. 3 is a graph illustrating output characteristics of an $O_2$ sensor as one example of the air-fuel ratio sensor.

FIG. 3 is a graph illustrating the output characteristics of the $O_2$ sensor as one example of the air-fuel ratio sensor 31. The $O_2$ sensor, which typically functions as a so-called ON/OFF sensor, rapidly changes its output near the stoichiometric air-fuel ratio. The air-fuel ratio sensor 31 used in this exemplary embodiment is an $O_2$ sensor which has a reference voltage of 0.45V. The air-fuel ratio sensor 31 outputs a high value of around 0.9V when the air-fuel ratio is rich and a low value of around 0.1V when the air-fuel ratio is lean. The ECU 2 then determines whether the engine air-fuel ratio is rich or lean based on the value output from the air-fuel ratio sensor 31.

Figure 4:
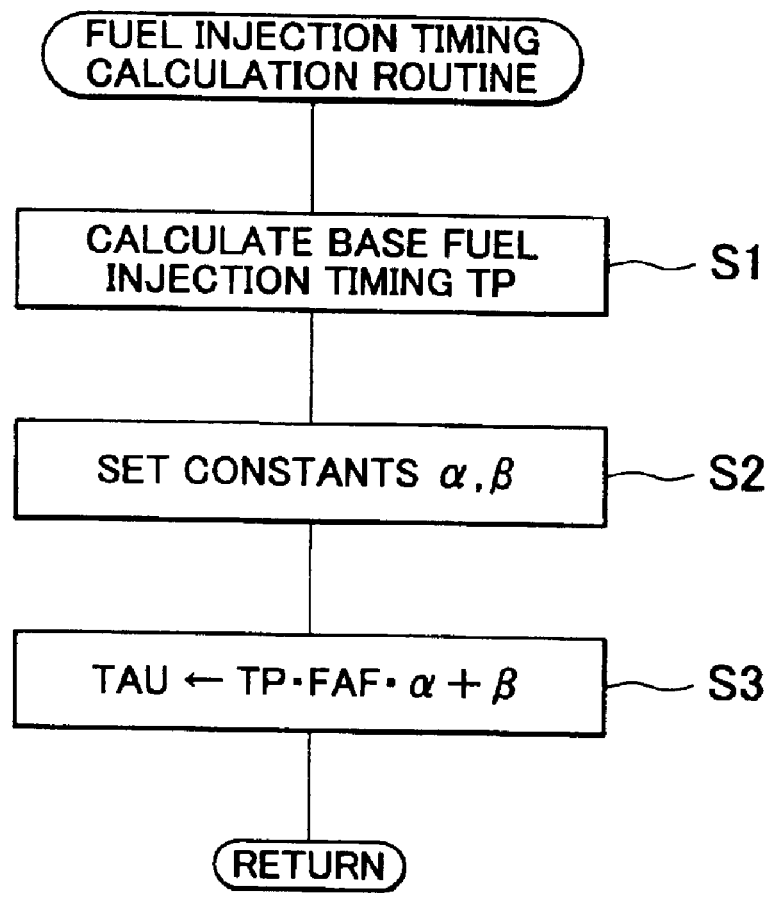
FIG. 4 is a flowchart showing the steps to calculate the fuel injection timing of the fuel injector.

The feedback control executed by the apparatus according to this exemplary embodiment is performed by the ECU 2 based on the values detected by the sensor. FIG. 4 is a flowchart showing the steps to calculate the fuel injection timing of the fuel injector 13. First, a base fuel injection timing TP is set (step S1). This base fuel injection timing TP is set to a value at which the engine air-fuel ratio becomes the stoichiometric air-fuel ratio based on the engine load determined from the intake air pressure and the engine speed.

Next, constants $\alpha$ and $\beta$ used for an increase correction and the like after startup are set (step S2). The constants $\alpha$ and $\beta$ are set according to the engine operating state, e.g., the coolant temperature and the like. Then an actual fuel injection timing TAU is calculated according to the following expression using an air-fuel ratio correction coefficient FAF (step S3).

$$TAU = TP \times FAF \times \alpha + \beta$$

This correction coefficient FAF is a correction value used to compensate for the difference when the engine air-fuel ratio is off from the stoichiometric air-fuel ratio. The reference value of the correction coefficient FAF is set to be "1.0." When the value output from the air-fuel ratio sensor 31 is high (i.e., the air-fuel ratio is rich), the correction coefficient FAF is set to a value less than "1.0." When the value output from the air-fuel ratio sensor 31 is low (i.e., the air-fuel ratio is lean), the correction coefficient FAF is set to a value greater than "1.0." As can be understood from the expression above, decreasing the correction coefficient FAF shortens the fuel injection timing TAU, which reduces the fuel injection quantity. Conversely, increasing the correction coefficient FAF lengthens the fuel injection timing TAU, which increases the fuel injection quantity. That is, the air-fuel ratio feedback control in the exemplary embodiment is control which changes the fuel injection timing by setting the correction coefficient FAF appropriately. In a broader sense, the air-fuel ratio feedback control is a series of processes shown in FIG. 4, which include the setting of the constants $\alpha$ and $\beta$ described above. When the engine air-fuel ratio is rich, it is corrected toward the lean side and when the engine air-fuel ratio is lean, it is corrected toward the rich side. The air-fuel ratio feedback control in this exemplary embodiment sets the correction coefficient FAF by different setting algorithms according to the fuel injection mode.

Figure 5:
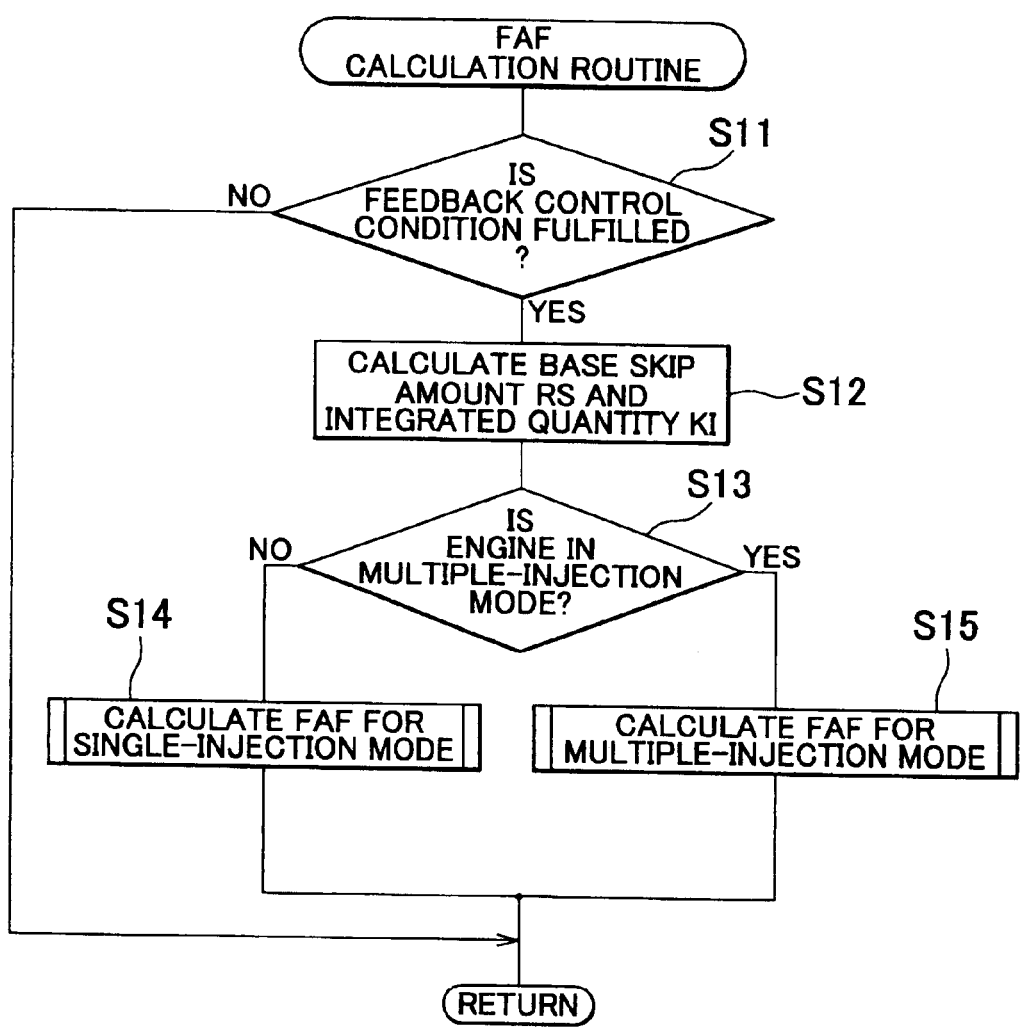
FIG. 5 is a flowchart showing the steps to calculate a correction coefficient FAF.

FIG. 5 is a flowchart showing the steps to calculate the correction coefficient FAF. This calculation is performed at a predetermined control cycle. First, it is determined whether a condition for executing feedback control has been fulfilled (step S11). The execution condition may, for example, be the requirement that the catalyst be activated, or that a predetermined amount of time has passed after a typical fuel cut has been cancelled. If any one of these execution conditions has not been fulfilled (i.e., NO in step S11), the routine for calculating the correction coefficient FAF ends.

If all of the execution conditions have been fulfilled (i.e., YES in step S11), a base skip amount RS and an integrated quantity KI are set (step S12). The base skip amount RS is a correction quantity that is added to or subtracted from the correction coefficient FAF when the value output from the air-fuel ratio sensor 31 shifts from the rich side toward the lean side or from the lean side toward the rich side. As will be described later, the integrated quantity KI is a correction quantity that is added to or subtracted from the correction coefficient FAF with the air-fuel ratio remaining in the lean or rich side. The integrated quantity KI is set to be less than the base skip amount RS.

Next, it is determined whether the engine is in the multiple-injection mode (step S13). If the engine is in the single-injection mode (i.e., NO in step S13), a single-injection mode FAF calculating routine is executed (step S14). On the other hand, if the engine is in the multiple-injection mode (i.e., YES in step S13), a multiple-injection mode FAF calculating routine is executed (step S15).

Figure 6:
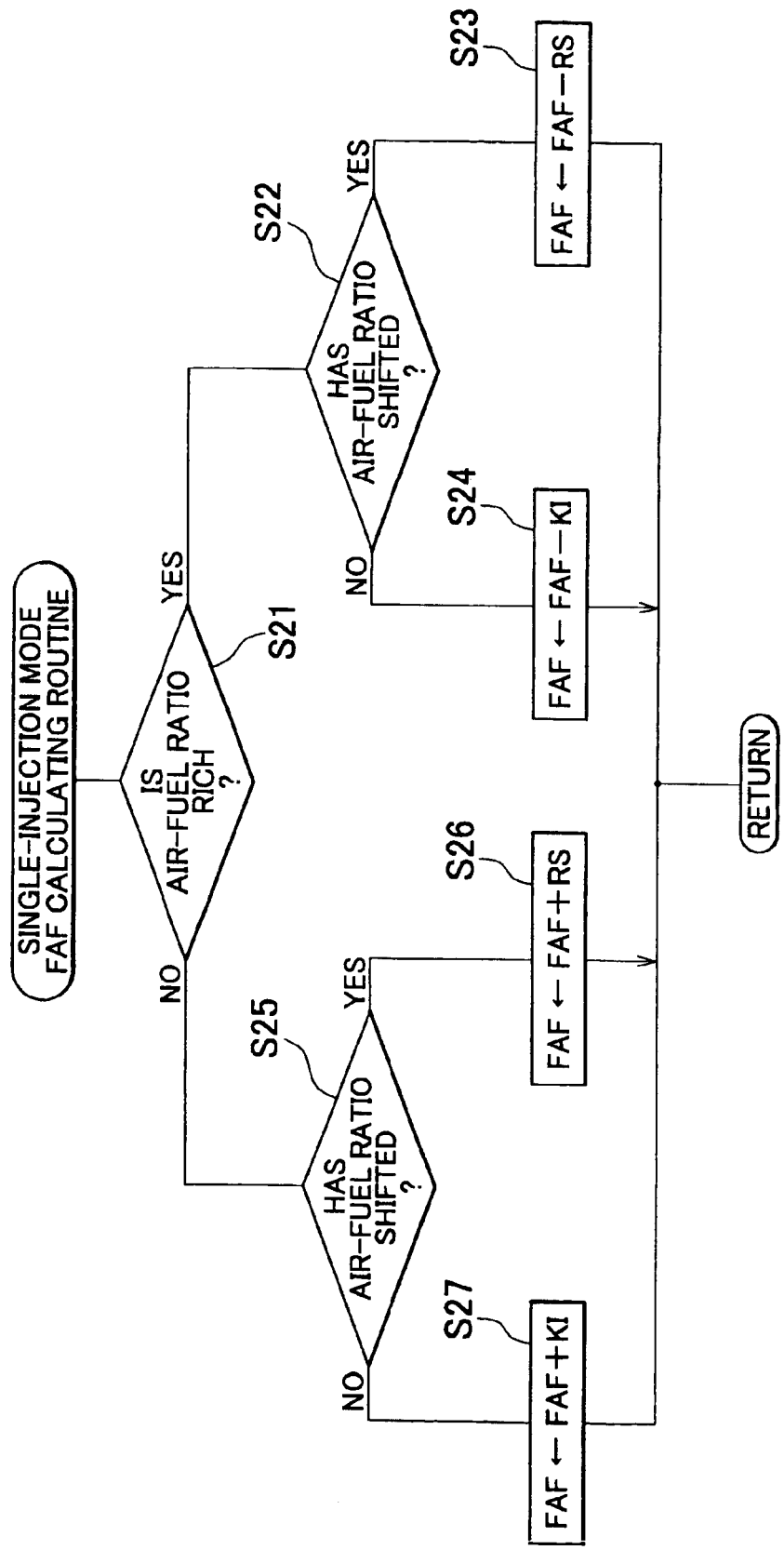
FIG. 6 is a flowchart showing the steps to calculate the correction coefficient FAF in a single-injection mode.
Figure 7:
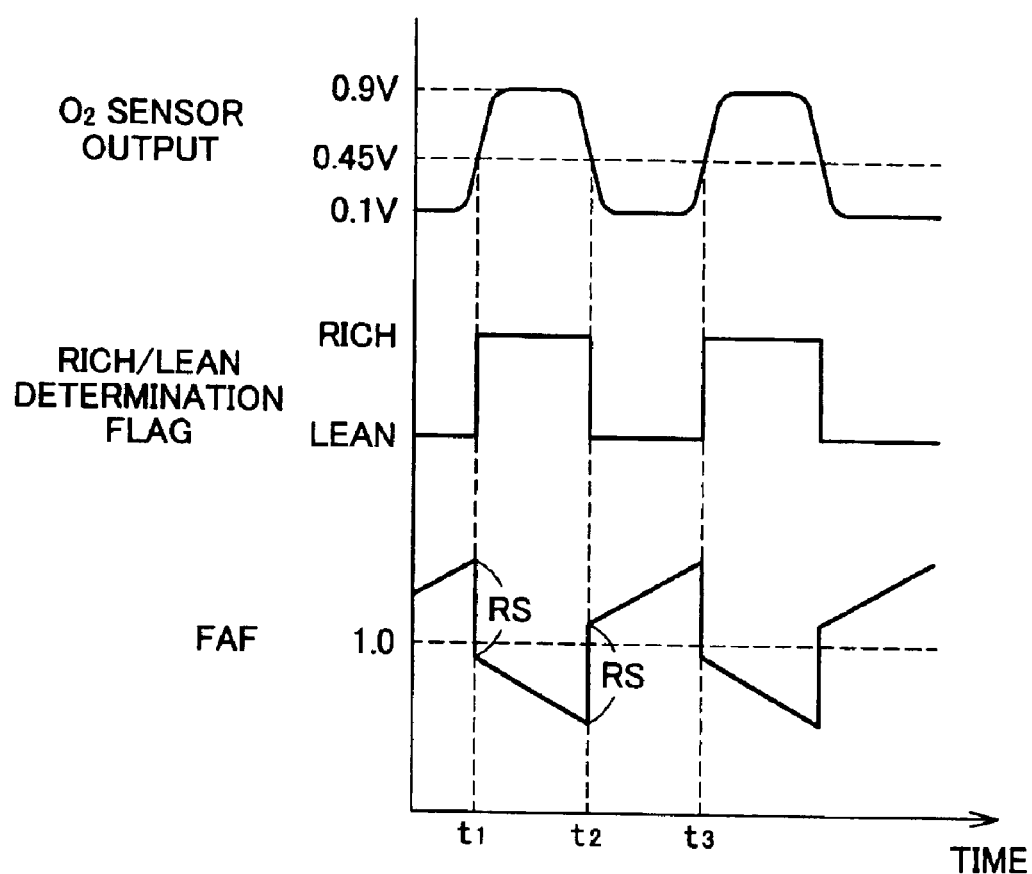
FIG. 7 is a timing chart showing the relationship between the output from the $O_2$ sensor, a rich/lean determination flag, and fluctuations in the correction coefficient FAF in the single-injection mode.

FIG. 6 is a flowchart showing the single-injection mode FAF calculating routine, which comprises the steps to calculate the correction coefficient FAF in the single-injection mode. FIG. 7 is a timing chart showing the relationship between the output from the O₂ sensor, a rich/lean determination flag, and fluctuations in the set correction coefficient FAF in the single-injection mode. If the value output from the air-fuel ratio sensor 31, which is an O₂ sensor, is higher than the reference voltage 0.45V, the ECU 2 determines that the engine air-fuel ratio is rich. Conversely, if the value output from the air-fuel ratio sensor 31 is lower than the reference voltage 0.45V, the ECU 2 determines that the engine air-fuel ratio is lean. The ECU 2 then sets the rich/lean determination flag accordingly. The flag determination may be made a predetermined amount of time after the value output from the air-fuel ratio sensor 31 has changed from the reference voltage 0.45V. This time delay in the rich/lean determination will be described later as a base TDR time and a base TDL time in a second exemplary embodiment of the invention. When the rich/lean determination flag is raised, it indicates that the engine air-fuel ratio has shifted from the lean side toward the rich side. Conversely, when the rich/lean determination flag is lowered, it indicates that the engine air-fuel ratio has shifted from the rich side toward the lean side. In the single-injection mode FAF calculating routine, the ECU 2 roughly adjusts the correction coefficient FAF by either adding or subtracting the base skip amount RS to or from the value of the current correction coefficient FAF at a timing that will shift the engine air-fuel ratio from either the rich side or the lean side toward the other side in order to quickly bring the engine air-fuel ratio close to the stoichiometric air-fuel ratio. The ECU 2 then finely adjusts the ratio correction coefficient FAF by continuing to add or subtract the integrated quantity KI until the engine air-fuel ratio shifts again.

More specifically, referring to FIG. 6, it is first determined whether the engine air-fuel ratio is rich based on the value output from the air-fuel ratio sensor 31 (step S21). When the engine air-fuel ratio is rich (i.e., YES in step S21), it is then determined whether the engine air-fuel ratio has shifted between lean and rich after the last control cycle (step S22). The last engine air-fuel ratio is stored in the memory of the ECU 2. When a shift in the engine air-fuel ratio from the lean side toward the rich side is detected at time $t_1$ (i.e., YES in step S22), the correction coefficient FAF is reduced by a skip of the base skip amount RS (step S23). If the engine air-fuel ratio then stays rich until time $t_2$ without shifting toward the lean side (i.e., NO in step S22), the integrated quantity KI is subtracted from the air-fuel ratio correction coefficient FAF each control cycle (step S24) such that the engine air-fuel ratio gradually becomes leaner (i.e., approaches the stoichiometric air-fuel ratio).

When it is determined at time $t_2$ that the engine air-fuel ratio is lean (i.e., NO in step S21), it is then determined whether there has been a shift in the engine air-fuel ratio after the last control cycle (step S25). When a shift in the engine air-fuel ratio from the rich side toward the lean side is detected at time $t_2$ (i.e., YES in step S25), the correction coefficient FAF is increased by a skip of the base skip amount RS (step S26). If the engine air-fuel ratio then stays lean until time $t_3$ without shifting toward the rich side (i.e., NO in step S25), the integrated quantity KI is added to the correction coefficient FAF each control cycle (step S27) such that the engine air-fuel ratio gradually becomes richer (i.e., approaches the stoichiometric air-fuel ratio).

In this manner, the air-fuel ratio correction coefficient FAF is adjusted in the single-injection mode using the base skip amount RS and the integrated quantity KI, such that it varies, with 1.0, for example, being the control center.

Figure 8:
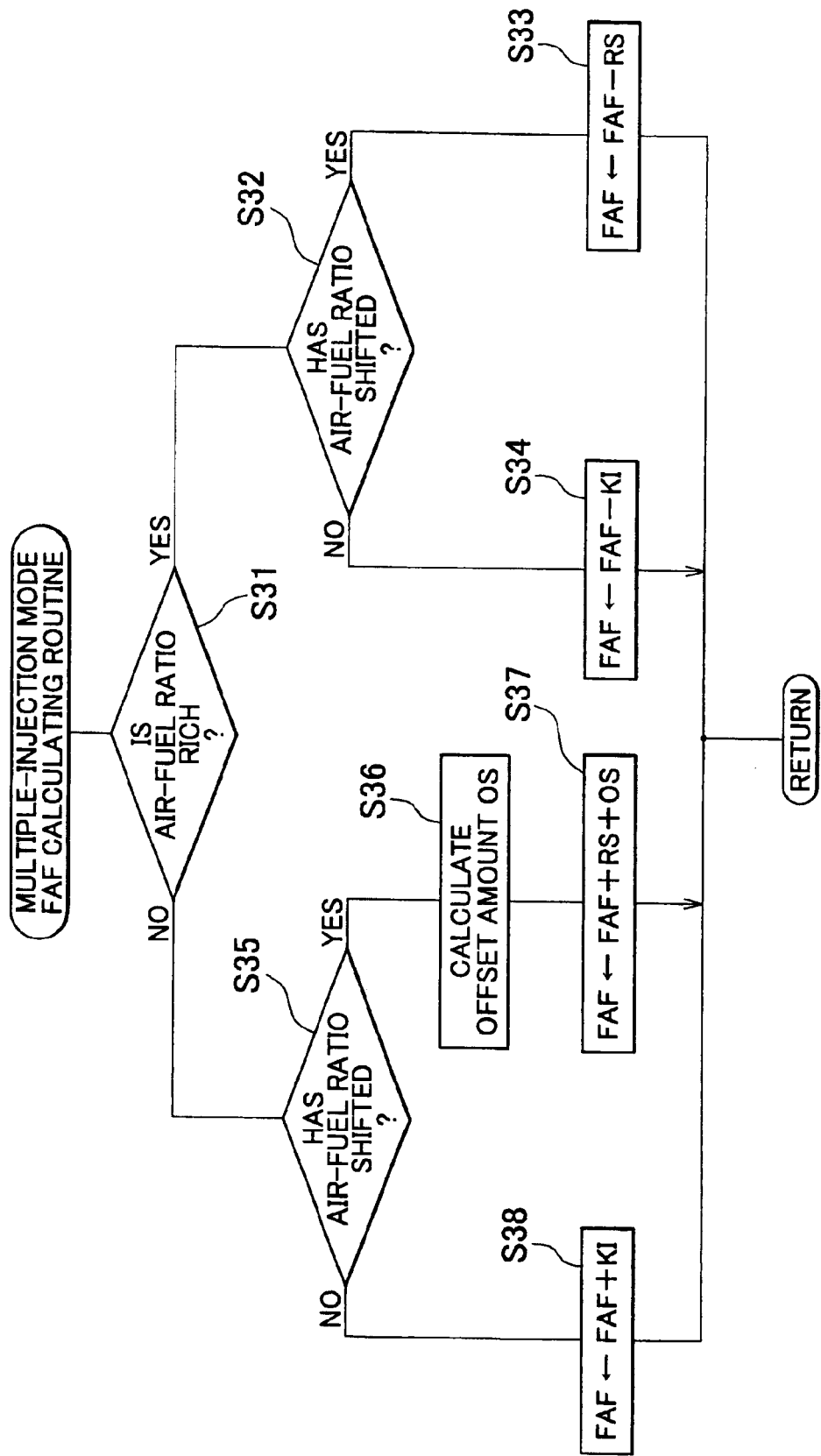
FIG. 8 is a flowchart showing the steps to calculate the correction coefficient FAF in a multiple-injection mode.
Figure 9:
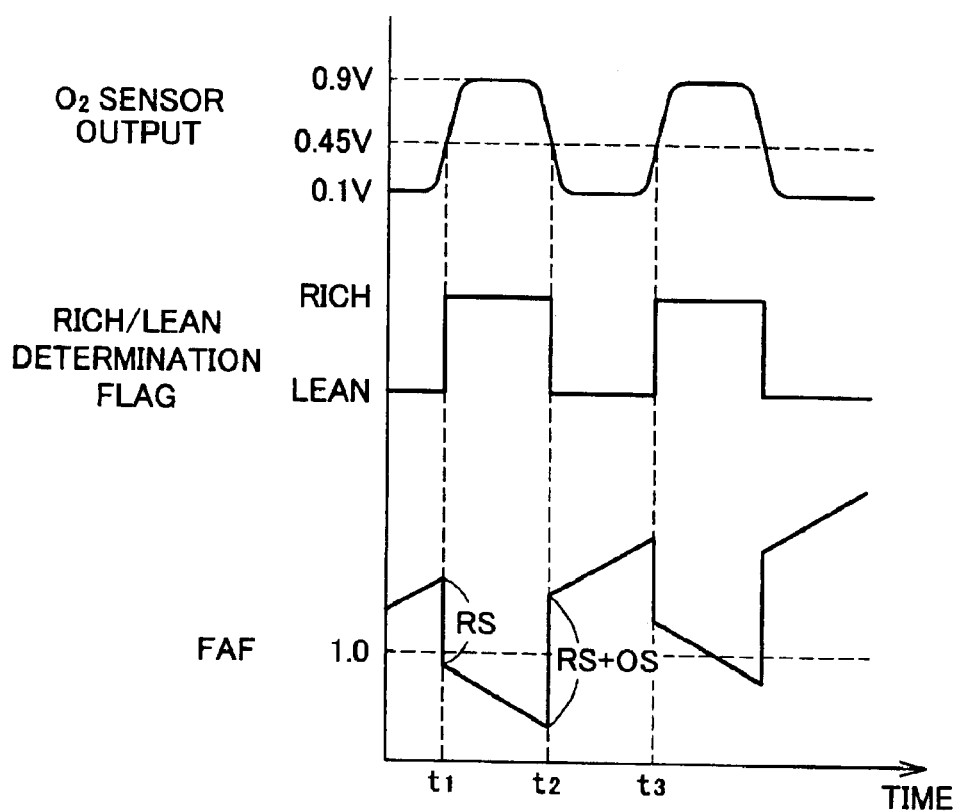
FIG. 9 is a timing chart showing the relationship between the output from the $O_2$ sensor, the rich/lean determination flag, and fluctuations in the correction coefficient FAF in the multiple-injection mode.

FIG. 8 is a flowchart showing the steps to calculate the correction coefficient FAF in the multiple-injection mode. FIG. 9 is a timing chart showing the relationship between the output from the O₂ sensor, a rich/lean determination flag, and fluctuations in the correction coefficient FAF in the multiple-injection mode. In the multiple-injection mode, even if the engine air-fuel ratio is actually lean, the air-fuel ratio sensor 31 may erroneously detect it as being rich, as mentioned above. Therefore, in the multiple-injection mode FAF calculating routine which comprises the steps for calculating the correction coefficient FAF in the multiple-injection mode, the correction coefficient FAF is calculated such that the amount of error in the erroneous detection by the air-fuel ratio sensor 31 is reduced or cancelled out.

First, it is detected whether the engine air-fuel ratio is rich based on the value output by the air-fuel ratio sensor 31 (step S31). When the engine air-fuel ratio is rich (i.e., YES in step S31), it is determined whether the engine air-fuel ratio has shifted (step S32). When a shift in the engine air-fuel ratio from the lean side toward the rich side is detected at time $t_1$ (i.e., YES in step S32), the base skip amount RS is subtracted from the correction coefficient FAF (step S33). If the engine air-fuel ratio then stays rich until time $t_2$ (i.e., NO in step S32), the integrated quantity KI is subtracted from the correction coefficient FAF each control cycle (step S34) so that the engine air-fuel ratio gradually becomes leaner (i.e., approaches the stoichiometric air-fuel ratio). These steps correspond to steps S21 to S24 in FIG. 6.

When it has been determined in step S31 that the engine air-fuel ratio is lean (i.e., NO in step S31), it is then determined whether the engine air-fuel ratio has shifted after the last control cycle (step S35). The step S35 corresponds to step S25 in FIG. 6. When it has been determined at time $t_2$ that the engine air-fuel ratio has shifted from the rich side toward the lean side (i.e., YES in step S35), an offset amount OS is calculated from the engine load and the coolant temperature (step S36). The offset amount OS is preferably mapped using the relationship between the engine load and the coolant temperature. The offset amount OS is a control amount for shifting a reference control value of the feedback control in the single-injection mode toward the rich side. The optimal value for the offset amount OS changes according to the engine load and coolant temperature.

Figure 10:
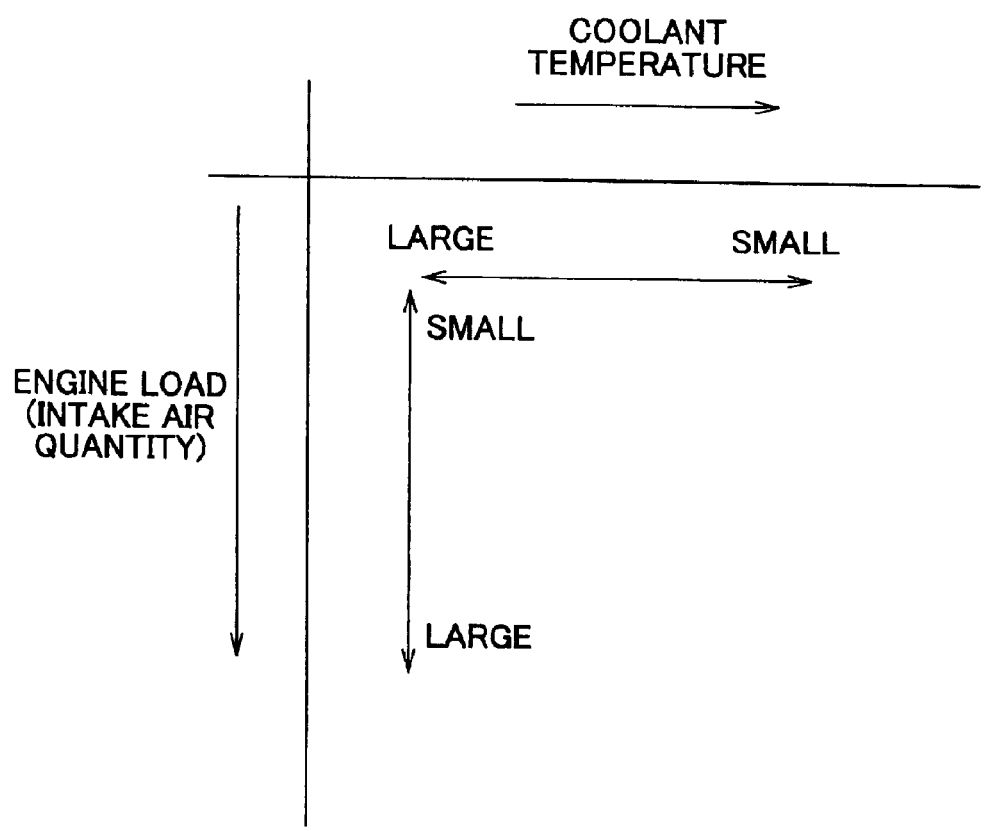
FIG. 10 is a graph schematically showing a map for calculating an offset amount OS.

FIG. 10 is a graph schematically showing a map for calculating the offset amount OS. The map value is obtained through experimentation and shows that there is a tendency for the offset amount OS to increase as the engine load increases, and decrease as the coolant temperature increases. First, when the engine load, i.e., the intake air quantity, increases, the engine air-fuel ratio shifts to the lean side. Therefore, when the intake air quantity has increased, it becomes necessary to return the engine air-fuel ratio toward the rich side, so the offset amount OS is increased.

Next, atomization of the injected fuel improves as the coolant temperature, i.e., the engine temperature, increases. Accordingly, a better combustion state is achieved when the engine temperature is high than when it is low. Thus when the amount of hydrogen in the exhaust gas decreases and the engine temperature is high, the air-fuel ratio sensor 31 detects an air-fuel ratio that is close to the actual engine air-fuel ratio. Therefore, because the amount of error in the detection is reduced when the coolant temperature is high, the offset amount OS is also reduced at that time.

Typically, the multiple-injection mode is selected and executed when the engine temperature is low, e.g., immediately after a cold start when the engine has not completely warmed up. As described above, the reference control value of the feedback control changes according to the engine temperature in the engine temperature range in which the multiple-injection mode is selected. It is preferable to change the control center such that the engine air-fuel ratio shifts farther toward the rich side when the engine temperature is low than when the engine temperature is high. In this exemplary embodiment, feedback control that matches the combustion state can be performed by appropriately changing the offset amount OS according to the engine temperature.

Returning to FIGS. 8 and 9, when the determination in step S35 is YES, the offset amount OS is calculated (step S36) and the base skip amount RS and the offset amount OS are added to the correction coefficient FAF (step S37) at time $t_2$. If the engine air-fuel ratio then stays lean until time $t_3$ without shifting toward the rich side (i.e., NO in step S35), the integrated quantity KI is added to the correction coefficient FAF each control cycle (step S38) so that the engine air-fuel ratio gradually becomes richer (i.e., approaches the stoichiometric air-fuel ratio). Step S38 corresponds to step S27 in FIG. 6.

Thus in the multiple-injection mode, the ECU 2 corrects the correction coefficient FAF by a skip of the base skip amount RS to shift the engine air-fuel ratio toward the lean side, and by the base skip amount RS plus the offset amount OS to shift the engine air-fuel ratio to the rich side, at the lean/rich determination timing. That is, the correction speed of the feedback to shift the engine air-fuel ratio from the lean side toward the rich side is made greater than the correction speed of the feedback control to shift the engine air-fuel ratio from the rich side toward the lean side. Therefore, the feedback control center is changed in a direction to make the engine air fuel ratio richer in the multiple-injection mode, relative to the control center in the single-injection mode. Accordingly, when the control center in the single-injection mode is 1.0, the control center in the multiple-injection mode is a value greater than 1.0. As a result, the error between the actual engine air-fuel ratio and the erroneously detected engine air-fuel ratio is absorbed, thereby achieving the desired objective.

According to this exemplary embodiment, the same base skip amount RS is used in both the single-injection mode and the multiple-injection mode. Alternatively, however, this skip amount may differ according to the fuel injection mode. Also in this exemplary embodiment, the same base skip amount RS is used when skipping to the rich side as when skipping to the lean side even in the multiple-injection mode. Alternatively, however, a rich skip amount RSR used when skipping toward the rich side and a lean skip amount RSL used when skipping toward the lean side, where the rich skip amount RSR is greater than the lean skip amount RSL, may also be obtained. In either case, the air-fuel ratio control apparatus according to this exemplary embodiment offsets the feedback control center in the multiple-injection mode farther toward the rich side than the feedback control center in the single-injection mode.

A second exemplary embodiment of the invention changes the control center of the feedback control by controlling the rich/lean determination timing. Just as in the first exemplary embodiment, in the single-injection mode, the rich/lean determination may be made at the point where the value output from the O$_2$ sensor changes from the reference voltage. In contrast to the first exemplary embodiment, however, the second exemplary embodiment gives an example in which the difference in responsiveness to the rich/lean determination by the O$_2$ sensor is taken into consideration, such that the rich/lean determination is made after a delay of the base TDR time and the base TDL time from the point at which the output value changed from the reference voltage. The base TDR time and the base TDL time are determination delay times in the single-injection mode and are mapped in advance as a base TDR map and a base TDL map, respectively, based on the engine temperature and the like.

Figure 11:
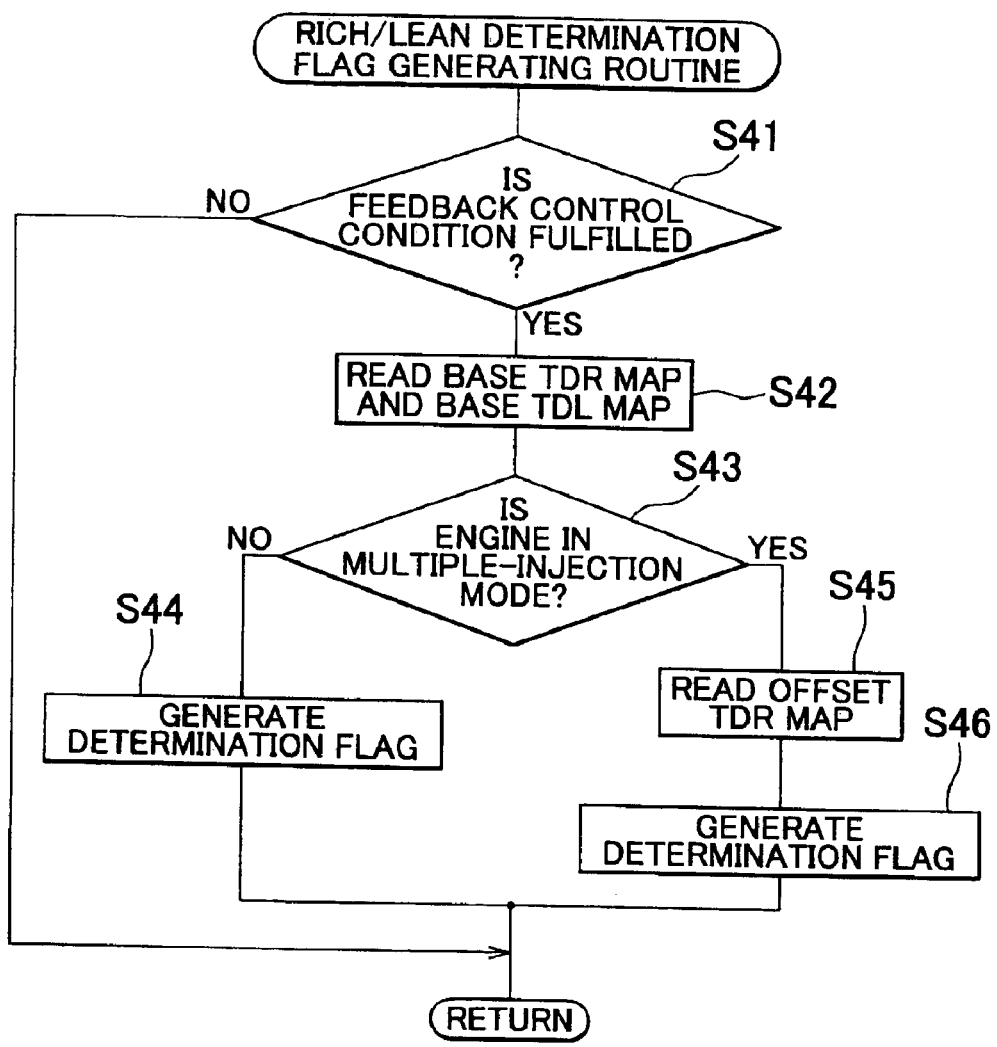
FIG. 11 is a flowchart showing the steps to generate a rich/lean determination flag according to a second exemplary embodiment of the invention.

FIG. 11 is a flowchart showing the steps to generate a rich/lean determination flag according to the second exemplary embodiment of the invention. First it is determined whether the execution condition for the feedback control has been fulfilled (step S41). Step S41 corresponds to step S11 in FIG. 5. The base TDR map and the base TDL map are then read (step S42) and it is detected whether the engine is in the multiple-injection mode (step S43). If the engine is not in the multiple-injection mode (i.e., NO in step S43), a rich/lean determination flag for the single-injection mode is generated based on the base TDR time and the base TDL time (step S44). On the other hand, if the engine is in the multiple-injection mode (i.e., YES in step S43), an offset TDR map is read (step S45) and the rich/lean determination flag is generated based on the base TDR time, an offset TDR time, and the base TDL time (step S46). The offset TDR map is a map of the offset TDR time used to offset the control center of the feedback control in the multiple-injection mode toward the rich side. This offset TDR time is added to the base TDR time. The offset TDR time is determined by the relationship shown in FIG. 10, just like the offset amount OS described in the first exemplary embodiment. That is, the offset TDR time becomes longer as the engine load, i.e., the intake air quantity, increases, and shorter as the coolant temperature, i.e., the engine temperature, increases. This is because as the intake air quantity increases the flow rate increases, so the offset TDR time is increased accordingly, and as the engine temperature rises the combustion state improves, so the offset TDR time is shortened accordingly.

Figure 12:
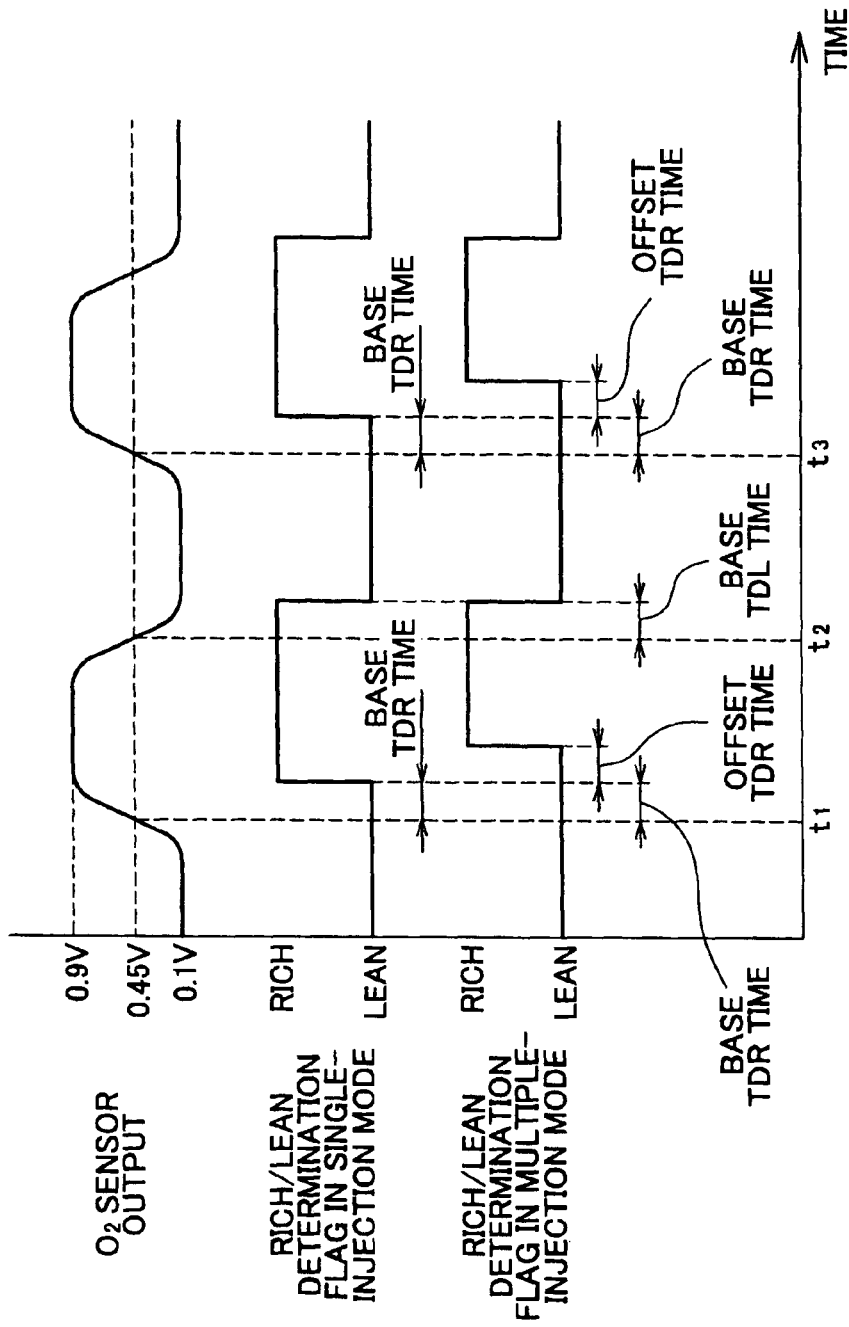
FIG. 12 is a timing chart showing the relationship between the output of an $O_2$ sensor, and the rich/lean determination flag in a single-injection mode and the rich/lean determination flag in a multiple-injection mode.

FIG. 12 is a timing chart showing the relationship between the output of the O$_2$ sensor, and the rich/lean determination flag in both the single and multiple injection modes. In a determination that the engine air-fuel ratio has shifted from lean to rich when the engine is in the single-injection mode, the ECU 2 determines that the engine air-fuel ratio is rich after the base TDR time has passed from the point at which the value output from the O$_2$ sensor exceeded the reference voltage 0.45V at time $t_1$ and time $t_2$.

On the other hand, when the engine is in the multiple-injection mode, the ECU 2 determines that the engine air-fuel ratio is rich after both the base TDR time and the offset TDR time have passed from the point at which the value output from the O$_2$ sensor exceeded the reference voltage 0.45V. This offset TDR time is obtained from the coolant temperature and the engine load.

Further, in a determination that the engine air-fuel ratio has shifted from rich to lean, the ECU 2 determines that the engine air-fuel ratio is lean after the base TDL time has passed from the point at which the value output from the O$_2$ sensor falls below the reference voltage 0.45V at time $t_2$. That is, in the multiple-injection mode, the control center of the feedback control is offset to the rich side by the sum of the base TDR time and the offset TDR time being greater than the base TDL time. In other words, the ECU 2 is able to control the feedback control center to the rich side by delaying the start timing of the feedback control to shift the engine air-fuel ratio from the rich side toward the lean side with respect to the start timing of the feedback control to shift the engine air-fuel ratio from the lean side to the rich side, using the respective timings or points at which the value output from the air-fuel ratio sensor 31 switches with respect to the reference voltage as the respective starting points. With the rich/lean determination flag thus set, the ECU 2 changes the correction coefficient FAF by the base skip amount RS when the rich/lean determination flag raises and lowers.

In this way, when the engine is in the multiple-injection mode, the ECU 2 delays the timing of the lean/rich determination and then further delays the timing of the lean-to-rich determination by the offset TDR time, with the respective points at which the value output from the air-fuel ratio sensor 31 switches with respect to the reference voltage as the respective starting points. Therefore, the feedback center shifts farther to the rich side than it does with the single-injection mode and the error between the actual engine air-fuel ratio and the erroneously detected engine air-fuel ratio is absorbed, thereby achieving the desired objective.

Hereinafter, the invention will be described based on the exemplary embodiment. It should be noted, however, that, although the invention has been described herein with reference to specific embodiments, many modifications and variations therein will readily occur to those skilled in the art. Accordingly, all such variations and modifications are included within the intended scope of the invention. Further, this invention can be implemented with further variations and modifications as necessary.

According to the foregoing embodiment, an $O_2$ sensor is used for the air-fuel ratio sensor 31. Alternatively, however, a sensor having more of an analog type detection function, such as an A/F sensor, may also be used. The A/F sensor applies a predetermined voltage between internal electrodes and detects the current that flows according to the difference in oxygen concentration between the exhaust gas and the atmosphere. The detected current value indicates the oxygen concentration.

Figure 13:
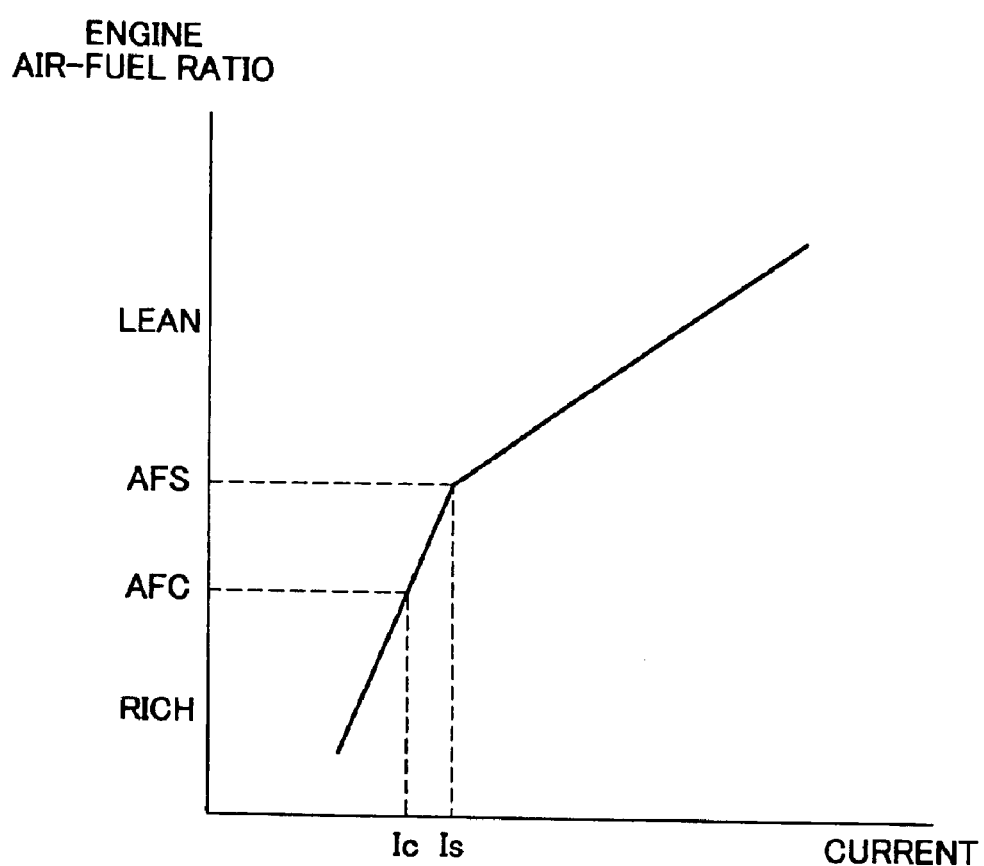
FIG. 13 is a graph showing the relationship between a detected current value and the engine air-fuel ratio in the A/F sensor.

FIG. 13 is a graph showing the relationship between a detected current value and the engine air-fuel ratio in the A/F sensor. In the single-injection mode, a current value Is corresponds to a stoichiometric air-fuel ratio AFS. When the current value is less than Is, it is determined that the engine air-fuel ratio is rich. Conversely, when the current value greater than Is, it is determined that the engine air-fuel ratio is lean. In the multiple-injection mode, the A/F sensor reacts to hydrogen in the exhaust gas in such a way that it sends out detection results indicating a rich engine air-fuel ratio when the engine air-fuel ratio is actually lean. Therefore, an air-fuel ratio AFC that is richer than the stoichiometric air-fuel ratio AFS is used as the reference in the lean/rich determination, and it is determined whether the engine air-fuel ratio is rich or lean based on a current value Ic which corresponds to that air-fuel ratio AFC. Accordingly, it is possible to appropriately perform feedback control in the multiple-injection mode by offsetting the control center of the feedback control of the A/F sensor to the rich side.

Further, according to a modified embodiment of the invention, when the engine is in the multiple-injection mode, the integrated amount in the control to shift the engine air-fuel ratio from the lean side toward the rich side is made greater than the integrated amount in the control to shift the engine air-fuel ratio from the rich side to the lean side. It is also possible to offset the control center of the feedback control to the rich side by making the correction speed of the control to shift the engine air-fuel ratio from the lean side to the rich side greater than the correction speed of the control to shift the engine air-fuel ratio from the rich side to the lean side.

Therefore, with the apparatus according to the exemplary embodiment of the invention, it is possible to appropriately control the engine air-fuel ratio and thus minimize deterioration of exhaust emissions when performing feedback control in the multiple-injection mode.

What is claimed is:

1. An apparatus for controlling an air-fuel ratio in a direct-injection internal combustion engine, comprising:
    an air-fuel ratio sensor provided in an exhaust passage of the engine; and
    a controller which
        i) selects between a first injection mode injecting fuel once in one cycle and a second injection mode injecting the fuel a plurality of times in one cycle, and controls the execution of the selected fuel injection mode,
        ii) performs feedback control based on a value output from the air-fuel ratio sensor such that an engine air-fuel ratio becomes a stoichiometric air-fuel ratio when either the first injection mode or the second injection mode is executed, and
        iii) changes a control center of the feedback control in the second injection mode by adjusting a correction coefficient toward a rich side relative to a control center of the feedback control in the first injection mode, so as to make the air-fuel ratio become equal to the stoichiometric air fuel ratio.

2. The apparatus according to claim 1, wherein the controller selects between the first injection mode and the second injection mode based on a temperature of the engine, and the controller selects the second injection mode when the temperature of the engine is low and changes the control center of the feedback control in the second injection mode according to the temperature of the engine.

3. The apparatus according to claim 2, wherein the controller changes the control center in the direction to make the air fuel ratio richer when the engine temperature is low, relative to the control center set when the engine temperature is high, in an engine temperature range in which the second injection mode is selected.

4. The apparatus according to claim 1, wherein the controller makes a correction speed of the feedback control to shift the engine air-fuel ratio from the lean side toward the rich side greater than a correction speed of the feedback control to shift the engine air-fuel ratio from the rich side toward the lean side.

5. The apparatus according to claim 4, wherein the controller controls a correction quantity of the feedback control to shift the engine air-fuel ratio from the lean side toward the rich side immediately after the engine air-fuel ratio has shifted from the rich side toward the lean side to be greater than a correction quantity of the feedback control to shift the engine air-fuel ratio from the rich side toward the lean side immediately after the engine air-fuel ratio has shifted from the lean side toward the rich side.

6. The apparatus according to claim 1, wherein the controller delays a start timing of the feedback control to shift the engine air-fuel ratio from the rich side toward the lean side with respect to a start timing of the feedback control to shift the engine air-fuel ratio from the lean side toward the rich side, using the points at which the value output from the air-fuel ratio sensor switches with respect to a reference value as respective starting points.

7. A method for controlling an air-fuel ratio in a direct-injection internal combustion engine having a first injection mode injecting fuel once in one cycle and a second injection mode injecting the fuel a plurality of times in one cycle, comprising the steps of:
    detecting an engine air-fuel ratio of the engine;
    performing feedback control such that the detected engine air-fuel ratio becomes a stoichiometric air-fuel ratio when either the first injection mode or the second injection mode is executed; and when the second injection mode is executed, changing a control center of the feedback control by adjusting a correction coefficient toward a rich side relative to a control center of the feedback control in the first injection mode, so as to make the air fuel ratio become eaual to the stoichiometric air fuel ratio.

* * * * *

UNITED STATES PATENT AND TRADEMARK OFFICE
CERTIFICATE OF CORRECTION

PATENT NO. : 6,901,906 B2
DATED : June 7, 2005
INVENTOR(S) : Yuichi Goto et al.

It is certified that error appears in the above-identified patent and that said Letters Patent is hereby corrected as shown below:

<u>Column 14,</u>
Line 3, change "eaual" to -- equal --.

Signed and Sealed this

Third Day of January, 2006

JON W. DUDAS
*Director of the United States Patent and Trademark Office*